INVENTOR.
JOHN W. MAUCHLY

LEGEND

March 25, 1958  J. W. MAUCHLY  2,828,447
NEON CAPACITOR MEMORY SYSTEM
Filed Sept. 28, 1954  3 Sheets-Sheet 3

INVENTOR.
JOHN W. MAUCHLY
BY
ATTORNEY

United States Patent Office 2,828,447
Patented Mar. 25, 1958

2,828,447

NEON CAPACITOR MEMORY SYSTEM

John W. Mauchly, Ambler, Pa., assignor to Remington Rand Inc., Philadelphia, Pa., a corporation of Delaware Application September 28, 1954, Serial No. 458,906

15 Claims. (Cl. 315—84.5)

This invention relates generally to the utilization of phenomena connected with the operation of gas tubes, and more particularly to storage networks which may be obtained through the combined operations of such gas tubes and condensers.

In a gas filled tube as, for example, in a cold-cathode gas tube like a neon bulb, a specific voltage value is needed to dislodge electrons from the gas molecules, which liberating process is commonly known as ionization. The term "ionization," "firing" or "ignition" potential has been used for such voltage value. As soon as ionization has started, the applied voltage may drop below the ignition value without disturbing the ionization process, provided that the voltage is still kept above a specific "de-ionization" or "extinction" value. The gas de-ionizes, and the tube stops conducting, if and when the applied voltage drops to or below this extinction value. It is to be stressed, however, that, although a difference between such ignition and extinction values may be expected in most cases, the existence of such a difference is in no way essential for the purposes of this invention. The fact remains, under all and any circumstances, that there is an ignition point and an extinction point, and it does not matter, as far as the basic principle is concerned, whether these two points actually represent two different voltage values or not. It may also be stated that, as a general rule, gas tubes which fire at a comparatively high level, extinguish, too, at a comparatively high level, and vice versa. Thus, a diode which fires at 90 volts may extinguish, let us say, at 75 volts, as contrasted to another diode which may fire at 70 volts and extinguish at 50 volts.

The cathodes in such gas tubes may have the same size and shape as the plates so that the direction of conduction depends entirely on the applied voltages, or the tubes may be so designed that they operate asymmetrically. In the latter case, two different ignition voltages and two different extinction voltages may have to be considered, the ignition and extinction values in one direction being lower than the corresponding values in the other direction. In this specification, the term "diode" will be exclusively used for asymmetrical tubes.

The fact that a gas tube conducts when the applied voltage is at or above the ignition value and that the tube stops conducting when the applied voltage is at or below the extinction value may be utilized by using the tube as a connecting and disconnecting link between a condenser and an electric impulse source, respectively. At the same time, the charging and discharging capacity of the condenser may be utilized by using the charging process as a means of reducing the voltage across the gas tube to the extinction point while the discharge of the capacitor may be used to raise the voltage to or above the ignition point. Thus, through the application of appropriate voltages, it is possible to establish a network in which the condenser functions as a "pulse trap" or storage device. The electric impulses then remain "trapped" in the condenser until the application of selected voltages permits the condenser to discharge. This is the basic principle of the present invention which may be applied in a number of different ways as will be shown hereinafter.

Accordingly, objects of the invention are:

To provide a new and improved electric switching device;

To provide a new and improved storage device, either as a single storage unit or as a large scale storage assembly;

To provide a new and improved delay line;

To provide a new and improved multivibrator network;

To provide a new and improved flip-flop circuit;

To provide a new and improved electric counter.

Other objects of the invention will become apparent when the following detailed description is read in conjunction with the drawings in which:

Figure 1 shows a circuit illustrating an elementary embodiment of the invention;

Figure 2a exemplifies a circuit wherein the read-in and read-out synchronizing pulses are obtained from two different sources;

Figure 4A:
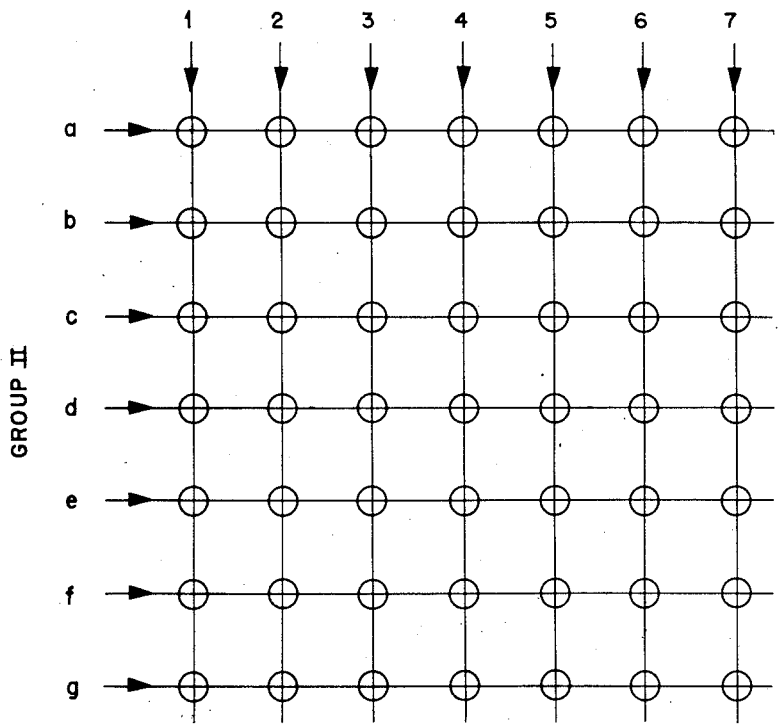
Figure 4a illustrates the use of a plurality of pulse traps as members of a matrix arrangement wherein each pulse trap comprises a capacitor and one associated gas tube.
Figure 4B:
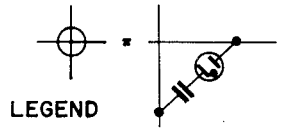

Figure 4b exemplifies a matrix arrangement wherein each pulse trap comprises a capacitor and two associated gas tubes.

Figure 5:
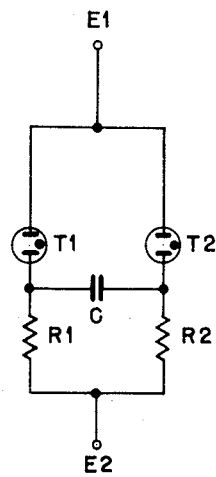
Figure 6:
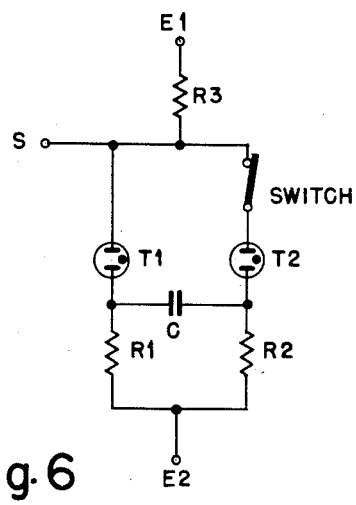
Figure 7:
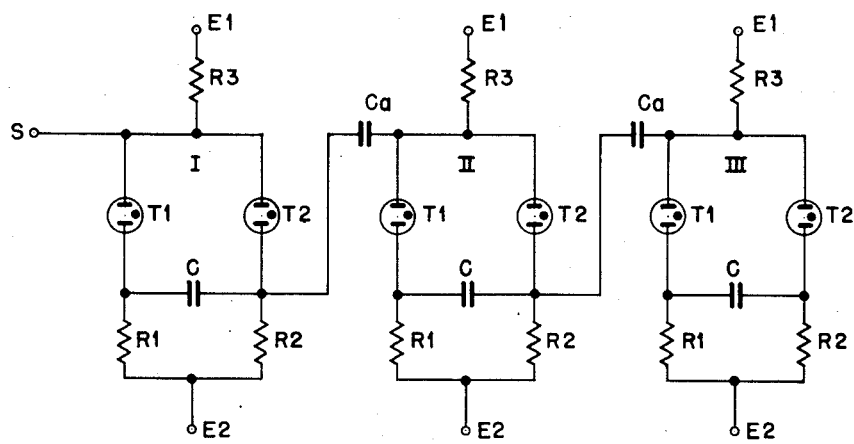
Figure 8:
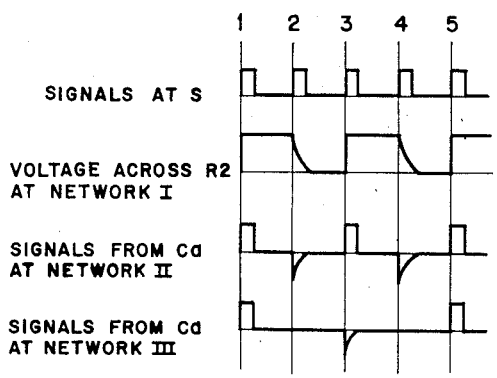

Figure 5 shows a multivibrator network employing two gas tubes and one capacitor;

Figure 6 exemplifies an arrangement of two gas tubes and one capacitor operating as a flip-flop;

Figure 7 illustrates a plurality of flip-flops each one comprising two gas tubes and one capacitor to be used as a counter, and Figure 8 gives a timing diagram for the counter shown in Figure 7.

Figure 1:
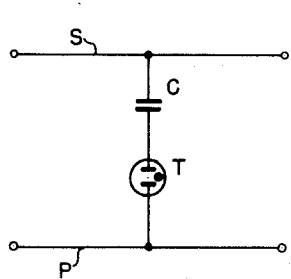

Figure 1 shows an elementary form of a device built upon this principle. A condenser C in series with a gas tube T is connected between a signal line S and a synchronizing pulse line P. To illustrate the operation, it may be assumed that plus 50 volt signals are applied to S, and a minus 60 volt pulse is sent through P. It is further assumed that the ignition and extinction voltages of T are 90 and 75, respectively. Under these assumptions, T fires when a signal on S and a pulse on P coincide because the potential difference across T is then above 90 volts. T continues to conduct until the potential across it drops to 75 volts. Hence, the condenser is charged with a potential difference of about 35 volts. This charge remains "trapped" because T is cut off.

When it is desired to recover the original signal at a later time, a new synchronizing pulse may be applied to P which is opposite in polarity to the original synchronizing pulse. For instance, with a plus 60 volt pulse applied to P, and S being at zero volts, the voltage difference across T (35 plus 60) is large enough to fire T.

In the example of Figure 1, it has been assumed that circuits exterior to the pulse trap itself determine whether and when read-in and read-out operations are to take place. It is possible, however, to combine at least a part of such discriminating circuitry with the pulse trap circuit as exemplified in Figures 2a and 2b. These figures illustrate, at the same time, the use of two gas tubes which are connected in parallel relative to each other, but each of which is connected in series with one and the same capacitor.

Figure 2A:
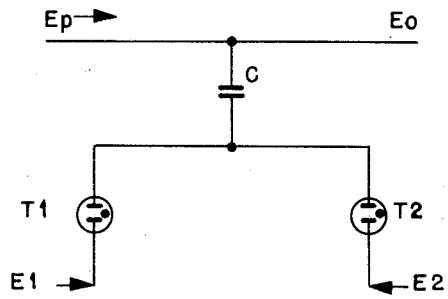
Figure 2b illustrates a circuit arrangement wherein the signal input and signal output are isolated.

In the case of Figure 2a, the read-in and read-out synchronizing pulses are obtained from two different sources. Whenever a signal pulse E$p$ coincides with an appropriate read-in synchronizing pulse E1, capacitor C is charged through gas tube T1. As soon as capacitor C has been charged, the next following read-out synchronizing pulse E2 causes the gas tube T2 to conduct which, in turn, leads to a discharge of C.

Figure 2B:
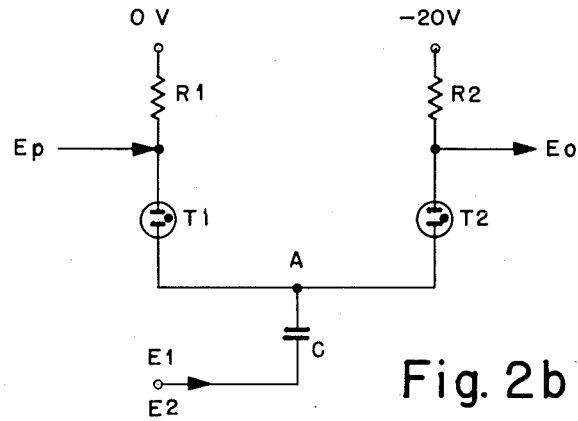

While Figure 2a illustrates the isolation of the read-in and read-out synchronizing pulses, the arrangement of Figure 2b isolates the signal input and the signal output. It is assumed, as an example, that both tubes have an ignition voltage of 80 volts and an extinction voltage of 60 volts. It is also assumed that the signal pulse E$p$ is plus 50 volts, that the read-in synchronizing pulse E1 is minus 50 volts, and that the read-out synchronizing pulse E2 is plus 50 volts. The drawing indicates the no-signal level of the signal input line at zero volts and the no-signal level of the signal output line at minus 20 volts. The difference in these no-signal levels ensures that the output gas tube T2 ignites first, if the voltage across both the input gas tube T1 and this tube could rise above the ignition value. The capacitor C is interposed between the synchronizing pulse line and point A which represents the junction of the two tubes.

Whenever a signal pulse E$p$ coincides with a read-in synchronizing pulse E1, the voltage across T1 is 100 volts, and T1 conducts. After extinction, the remaining voltage at point A is plus 40 volts. The arrival of a read-out synchronizing pulse E2 brings the voltage across T2 to 110 volts and causes T2 to fire. When E2 is removed, the remaining voltage at point A is plus 40 minus 50 or minus 10 volts. If E1 is then applied without a coinciding E$p$, the voltage at point A becomes minus 60 which is below the ignition value of T1. If an E$p$ coincides, however, the potential difference across T1 rises to 110 volts, and T1 ignites. Point A shows minus 60 volts, while E1 is applied, and changes to plus 40 volts after removal of E1. This is insufficient for firing either T1 or T2. The arrival of E2 changes the situation. If both the signal input line and the signal output line were kept at a zero no-signal level, both gas tubes would be in a condition to fire. It was assumed, however, that the no-signal level of the signal input line is zero while the no-signal level of the signal output line is minus 20 volts. As a result, T2 fires at a time when the voltage at point A has only risen to 60 volts which, in turn, keeps point A from rising to a voltage level which is high enough to ignite T1.

The circuitry of Figure 2b may be simplified, if asymmetric gas tubes (diodes) are used. In such case, the ignition value in one direction will be lower or even much lower than in the opposite direction. Let us assume that T1 conducts at 80 volts when E$p$ is positive and E1 is negative, and that the ignition value is 120 volts when there is no E$p$ and E2 is positive. There would be no need, under these circumstances, to connect the voltage level ties R1 and R2 to different reference potential conductors as is advisable when symmetric tubes are employed.

Figure 3:
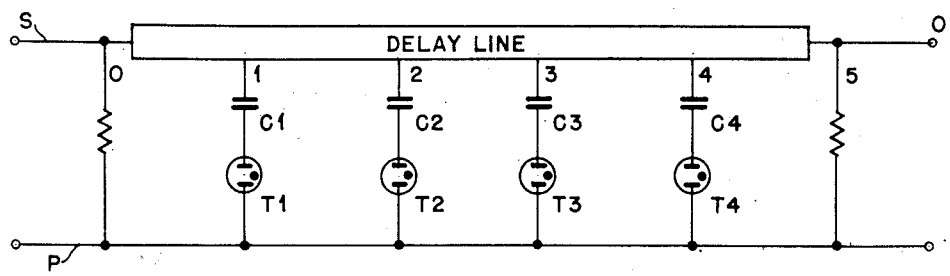
Figure 3 shows a plurality of pulse traps in combination with a delay line.

Figure 3 shows a plurality of pulse traps in combination with a delay line. S is the input terminal and O is the output terminal of a signal line which comprises a plurality of inductors in series connection. P is a bus carrying the synchronizing pulses. The pulse traps are connected in parallel between inductor terminals and the bus. The signals at S may be, for example, plus 50 volts, and the synchronizing pulses on P may be, for example, minus 60 volts. We assume, furthermore, that the ignition voltage of the gas tubes is 90 volts and the extinction voltage 75 volts. It now depends upon the timing of the signal pulses and synchronizing pulses whether a signal pulse and a synchronizing pulse arrive simultaneously at their respective sides of any of the gas tubes. If there is such a coincidence, the gas tube fires because the potential difference across the tube exceeds the ignition voltage, and it continues to conduct until the potential across the tube drops to 75 volts. Hence, the associated condenser charges up to a potential difference of about 35 volts. If there is no coincidence of arrival of both the signal pulse and the synchronizing pulse, the voltage across the tube is not large enough to ignite the bulb. It should be understood that the synchronizing pulse must have a duration which is long enough to permit an effective charging of the capacitor, but still short enough to sharply define the coincidence period for each of the tubes involved. As a result, the signals which are not met at predetermined points by a coinciding synchronizing pulse are clearly separated from those signals which, due to the coincidence with a corresponding synchronizing pulse, are intended to be "trapped" in the condensers. These trapped signals may later be recovered in the same way as was described above in connection with the discussion of Figure 1.

Figure 4B:
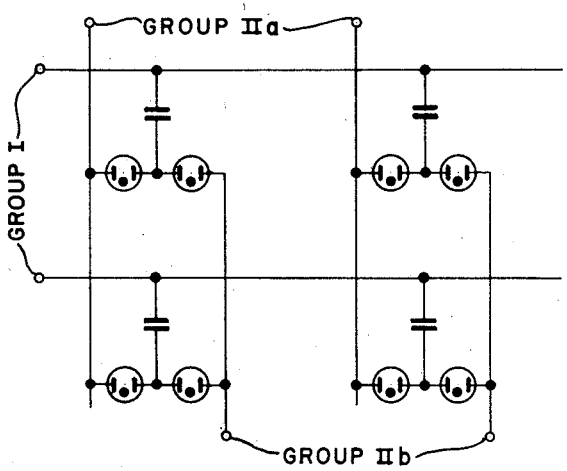

Among the many combinations in which pulse traps may be effectively employed, the use of such traps as members of a matrix arrangement deserves special consideration. Figure 4a illustrates a register or storage device which, on a larger scale, takes advantage both of the storing capacity of condensers and the switching capacity of the gas tubes. One dimension of the conductor arrangement may be used to supply the information signals, and the other dimension may be used for the application of the synchronizing or control pulses which govern read-in and read-out. Each individual conductor in one dimension is connected through a pulse trap to an individual conductor in the other dimension. It should be understood, however, that the group I and group II busses shown in Figure 4 may be used interchangeably, either group for the signals to be stored and the other for the application of the control signals.

In operation, the potential difference between the selected matrix lines is increased to the point where it exceeds the ignition value of the connecting gas tube. As a result, the associated capacitor is charged. As soon as the applied voltage is reduced to or below the extinction voltage, the gas tube becomes a high impedance element and, thus, preserves the charge on the condenser. To read from the memory, a voltage of opposite polarity is applied which, taken by itself, is too small to reach the ignition value of the tube, but large enough, on the other hand, to cause the tube to fire, if and when the applied voltage in conjunction with the stored charge on the associated capacitor reaches the ignition point. As a result, only such tubes can fire which are associated with a previously charged capacitor.

To give an example, it is assumed that a seven-bit binary digit train is to be stored which, being in serial form, appears on one input line only, let us say, on line 5. Accordingly, the other information input lines of group I, namely 1, 2, 3, 4, 6 and 7, do not carry any signals during this process. Line 5, on the other hand, introduces the information in form of a code combination in which the intelligence is expressed through combinations of signals and no-signals as, for example, 1110 01 1. A 1 may stand here for the presence of a signal and a 0 for the absence of a signal. As a result, at time $t1$, there will be a signal on line 5, and at time $t4$, there will be no signal and so on. Synchronizing pulses corresponding to the time of occurrence of each of these seven signals or no-signals are introduced in sequence, for example, on lines $a$ to $g$ inclusive of the group II busses. The voltages both for the information signals and for the synchronizing pulses are so selected that they together produce a potential difference across the connecting gas tubes which is at or above the ignition value, but that neither one alone is sufficient to cause the tubes to fire. As a result, only those gas tubes are rendered conductive which are subjected to the coincidence effect of a signal and a synchronizing pulse, and only the capacitors associated with these conducting tubes receive a charge. The other capacitors remain uncharged. Assuming that the synchronizing pulse at time $t1$ is applied to control pulse line "$a$," and that each one of the subsequent synchronizing pulses is applied individually and consecutively to the next following control line, respectively, and also assuming that the information arriving on line 5 consists of the code combination used as an example hereinabove, the condensers belonging to pulse traps 5a, 5b, 5c, 5f and 5g are charged. The condensers 5d and 5e are not charged because the information at times $t4$ and $t5$ is represented by the absence of signals. The charges on condensers 5a, 5b, 5c, 5f and 5g become trapped as soon as the voltage difference across the associated gas tubes drops to or below the extinction value. The subsequent read-out can then be accomplished through the application of a voltage to busses $a$ to $g$ inclusive which is opposite in polarity relative to the read-in synchronizing pulses and which, again, if taken by itself, is too small to drive the potential difference across any gas tube to or above the ignition point, but which, at the same time, is large enough to cause the firing of the tubes, if and when there is a charge on the associated capacitors. Only those tubes will fire, therefore, which are associated with previously charged condensers.

To give a second example, it is assumed that the same code combination is presented in parallel and that the group II busses receive the information. Accordingly, five busses, let us say, busses $a$, $b$, $c$, $f$ and $g$, receive a signal while the recited code combination does not provide a signal for busses $d$ and $e$. Then the register into which the code combination is to be read-in is selected through application of a read-in synchronizing pulse to, let us say, line 5. On the basis of these assumptions, the condensers 5a, 5b, 5c, 5f and 5g receive a charge. The final result is the same, therefore, as in the first example, but this result has been obtained from a differently arranged information input.

The isolation of signal input and signal output, as explained in connection with Figure 2b, may be applied to a matrix arrangement. Figure 4b exemplifies such an arrangement wherein two gas tubes are associated with each capacitor. One tube in each set is directly connected to any II$a$ bus, and the other tube in each set is directly connected to any II$b$ bus. The II$a$ tubes may then be used for the read-in and the II$b$ tubes for the read-out, or vice versa.

Pulse traps may be used advantageously in quite a number of other arrangements. Figures 5, 6 and 7 illustrate the use of pulse traps each of which comprises a combination of two gas tubes and one associated capacitor. Figures 2a and 2b showed the same kind of a combination, but there the capacitor was interposed between each of the two tubes and one of the voltage sources. In contrast thereto, the arrangements of Figures 5, 6 and 7 interpose a series resistor between each of the tubes and one of the voltage sources, respectively, while the capacitor is connected between these two resistors.

Turning now more specifically to Figure 5, voltages are applied at the two potential terminals E1 and E2 which, in accordance with the explanations given hereinbefore, are apt to produce an ignition potential across one of the tubes. Let us assume that T1 is the first tube to become conductive. When T1 becomes conductive, the current passing through resistor R2 suffers enough of a voltage drop to keep the voltage across T2 below the ignition value. This situation changes, however, as soon as the voltage drop across resistor R2 becomes reduced, due to the charging of the capacitor. This, in turn, leads to the ignition of T2. When the current passes through T2, resistor R2 again produces a voltage drop which substantially might be equal to its previous maximum voltage drop. This causes the capacitor to discharge through tube T1 in a direction which is opposite to the normal flow, thereby reducing the voltage across T1 to the extinction point. From here on the cycle repeats itself with the only difference that it is now resistor R1 which causes the voltage drop, and this voltage drop becomes reduced, due to the charging of the capacitor with the help of tube T2. This cycle of events may be continuously repeated at a frequency which can be determined through selection of the voltage, capacitance and resistance values involved.

The circuit of Figure 6 is identical with the one shown in Figure 5, except for the addition of a resistor R3 and of a signal input terminal S, these two additional members being connected to those tube terminals which are not connected to the capacitor and the resistors R1 and R2, respectively, and the resistor R3 being interposed between those terminals and the associated voltage source. This circuit may be operated as a flip-flop. To this end, the supply voltages must be so chosen that they are large enough to produce the ignition value, but also small enough so that, after the ignition of the first tube, the voltage drop across resistor R3 leaves an effective voltage which is below the ignition point. As a result, the device remains in a stable state. If and when it is desired to shift the device into its other stable state, a signal may be applied at S which furnishes the additional voltage needed to raise the potential across the non-ignited tube to the ignition value. A switching element may be added to the circuit which selectively opens the circuit of one of the two tubes for a short period of time so that it can be predetermined which one of the tubes is to conduct first.

Figure 7 illustrates a counter which comprises a plurality of networks, each one of which is of the same type as the one discussed in connection with Figure 6. Network I receives signals at input terminal S with the result that each signal shifts conductivity from one tube to the other. In network II the signal input terminal S is replaced by a differentiating capacitor $Ca$ which is connected to the junction of tube T2 and its associated series resistor R2 in network I. Network III and any other succeeding networks (not shown) are coupled to the preceding network in the same manner.

The timing diagram of Figure 8 indicates the operation of the counter. It shows the signals received at S, the voltages developed across resistor R2 of network I at alternating times, the signal delivered by the differentiating capacitor $Ca$ at network II, and the signals delivered by the differentiating capacitor $Ca$ at network III. When the first signal is received at S, conduction is transferred to tube T2 of network I, and resistor R2 produces a positive voltage output as shown. The next signal at S transfers conductivity to tube T1. This does not result, however, in an immediate reduction to zero of the voltage output at R2, but in an exponentially decreasing voltage output, as indicated, which is due to the charging operation of capacitor C. The positive voltage output at resistor R2 causes capacitor $Ca$ to emit a positive signal which affects network II in the same way as network I was affected by the positive signal at S. The reduction in voltage at R2 results in a negative signal emanating from $Ca$ which does not change the state of network II. It is evident, therefore, that every two changes in the state of network I produce only one change in the state of network II, and that network II, changes state only after four signals have been received at point S of network I. This procedure of arithmetic division may be extended over as many networks as desired, each network performing a specific counting function in the total chain.

The different circuits illustrated in this specificaton are advantageous in a number of ways. They are for example, of simple construction and comprise comparably inexpensive component parts all of which are capable of a long life. An extremely low current measurable in microamperes suffices for their operation. The cold gas tubes do not require any filament current. These circuits may be used as members of predominantly electronic devices as computers, for example, but also as controlling elements of electric apparatus. The circuit shown in Figure 5 may be used, for example, as a signalling device for railroad crossings or as a device for producing danger signals whenever the effective voltage exceeds a certain potential and so on.

It is to be understood that, while the description has dealt solely with a gas tube serving as an electrical circuit completing and breaking device, the invention is not limited to the use of gas tubes but includes the use of any device which will complete or break an electrical circuit in response to the existence thereacross of electrical potentials above or below specific values, respectively. One such device other than a gas tube is a relay.

While this invention has been described and illustrated with reference to a limited number of specific embodiments, it is to be understood that the invention is capable of various other modifications and applications, not departing essentially from the spirit thereof, which will become apparent to those skilled in the art.

What is claimed is:

1. In combination, a first and a second electric impulse source, two gas tubes connected in series between said first and second sources, a storage device and a third electric impulse source, said storage device connected between the junction of said gas tubes and said third source and storing impulses in response to impulses from said first and third sources, and releasing stored impulses in response to impulses from said second source.

2. The combination according to claim 1 wherein said storage device comprises a capacitor.

3. The combination according to claim 1 wherein one of said sources applies information pulses having definite information characteristics, and the other two of said sources apply control pulses having definite control characteristics.

4. In combination, a first electric impulse source and an output conductor, a first and a second gas tube connected in series between said first source and said conductor, a storage device and a second electric impulse source, said storage device connected between the junction of said gas tubes and said second source and storing impulses when said first tube is in a conductive state, and releasing stored impulses when said second tube is in a conductive state.

5. The combination according to claim 4 wherein the magnitude of the applied voltages either permits conductivity of said first tube and prohibits conductivity of said second tube or prohibits conductivity of said first tube and permits conductivity of said second tube.

6. The combination according to claim 5 including a first voltage source connected to the junction of said first electric impulse source and said first tube and a second voltage source connected to the junction of said output conductor and said second tube, whereby the voltages from said voltage sources in conjunction with the impulses from said second electric impulse source permit the conductivity of said second tube and prohibit the conductivity of said first tube.

7. The combination according to claim 6 including impedances interposed between said first voltage source and said first tube and between said second voltage source and said second tube, respectively.

8. The combination according to claim 4 wherein said tubes are diodes.

9. A storage system comprising, a first group of conductors, a second group of conductors, and series connected capacitors and gas tubes connected, respectively, between each conductor of said first group and each conductor of said second group, said capacitors being charged and discharged through their respective associated gas tube, wherein each series connected capacitor and gas tube are connected to a different pair of conductors.

10. The combination according to claim 9 comprising, means for applying information pulses having definite information characteristics to at least one conductor in one of said groups, means for applying control pulses having definite control characteristics to at least one conductor in the other one of said groups, both types of pulses being applied in a selective, correlated order, wherein the magnitude of the applied voltages either permits the storage of pulses and prohibits the release of stored pulses or prohibits the storage of pulses and permits the release of stored pulses.

11. A storage system comprising, a first group of conductors, a second group of conductors arranged in pairs, pairs of gas tubes connected in series between the members of each of said pairs of conductors in said second group, and capacitors connected between a conductor in said first group of conductors and the junction of the members of one of said pairs of gas tubes, said capacitors being charged through one gas tube within their respective associated pair of gas tubes and discharged through the other gas tube within the same pair, wherein each capacitor and its associated pair of gas tubes are connected to a different combination of a conductor in said first group and a pair of conductors in said second group.

12. In combination, a capacitor and a gas tube, one electrode of said capacitor being connected to one electrode of said gas tube, the other electrode of said capacitor being connected to a first electric impulse source, the other electrode of said gas tube being connected to a second impulse source, a second gas tube being connected to the junction of said capacitor and said first gas tube, and a connection to said second gas tube, wherein said capacitor is charged through said first gas tube and discharged through said second gas tube.

13. The combination according to claim 12 wherein said connection to said second gas tube comprises a third electric impulse source.

14. The combination according to claim 12 wherein said connection to said second gas tube comprises a signal output terminal.

15. In combination, a plurality of pulse traps, each said pulse trap comprising a capacitor and a gas tube in series connection, said pulse traps being connected in parallel between a plurality of electric impulse carrying lines, wherein the capacitor in each of said pulse traps is charged and discharged through its associated gas tube upon the application of impulses to said lines.

References Cited in the file of this patent

UNITED STATES PATENTS

| 2,231,674 | Ludwig | Feb. 11, 1941 |
| 2,252,766 | Holden | Aug. 19, 1941 |
| 2,541,041 | Crenshaw | Feb. 13, 1951 |
| 2,582,480 | Dimond | Jan. 15, 1952 |

UNITED STATES PATENT OFFICE
CERTIFICATE OF CORRECTION

Patent No. 2,828,447                            March 25, 1958

John W. Mauchly

It is hereby certified that error appears in the above numbered patent requiring correction and that the said Letters Patent should read as corrected below.

In the grant, lines 2 and 3, for "assignor to Remington Rand Inc., of Philadelphia, Pennsylvania, a corporation of Delaware" read --assignor, by mesne assignments, to Sperry Rand Corporation, of New York, N. Y., a corporation of Delaware--; line 12, for "Remington Rand Inc., its successors" read --Sperry Rand Corporation, its successors--; in the heading to the printed specification, lines 3, 4 and 5, for "assignor to Remington Rand Inc., Philadelphia, Pa., a corporation of Delaware" read --assignor, by mesne assignments, to Sperry Rand Corporation, New York, N. Y., a corporation of Delaware--.

Signed and sealed this 1st day of July 1958.

(SEAL)
Attest:

KARL H. AXLINE

Attesting Officer

ROBERT C. WATSON
Commissioner of Patents